C. T. Porter,

Governor.

No. 740. Reissued June 21, 1859

Witnesses:
Henry T. Brown
W. M. Simpson

Inventor:
Chas. T. Porter

N. PETERS, PHOTO-LITHOGRAPHER, WASHINGTON, D. C.

UNITED STATES PATENT OFFICE.

CHARLES T. PORTER, OF NEW YORK, N. Y.

IMPROVEMENT IN GOVERNORS FOR STEAM-ENGINES.

Specification forming part of Letters Patent No. 20,894, dated July 13, 1858; Reissue No. 740, dated June 21, 1859.

*To all whom it may concern:*

Be it known that I, CHARLES T. PORTER, of the city, county, and State of New York, have invented a new and useful Improvement in Centrifugal Governors for Steam-Engines and other Motors; and I do hereby declare that the following is a full, clear, and exact description of the same, reference being had to the accompanying drawings, forming part of this specification, in which—

Figure 1:
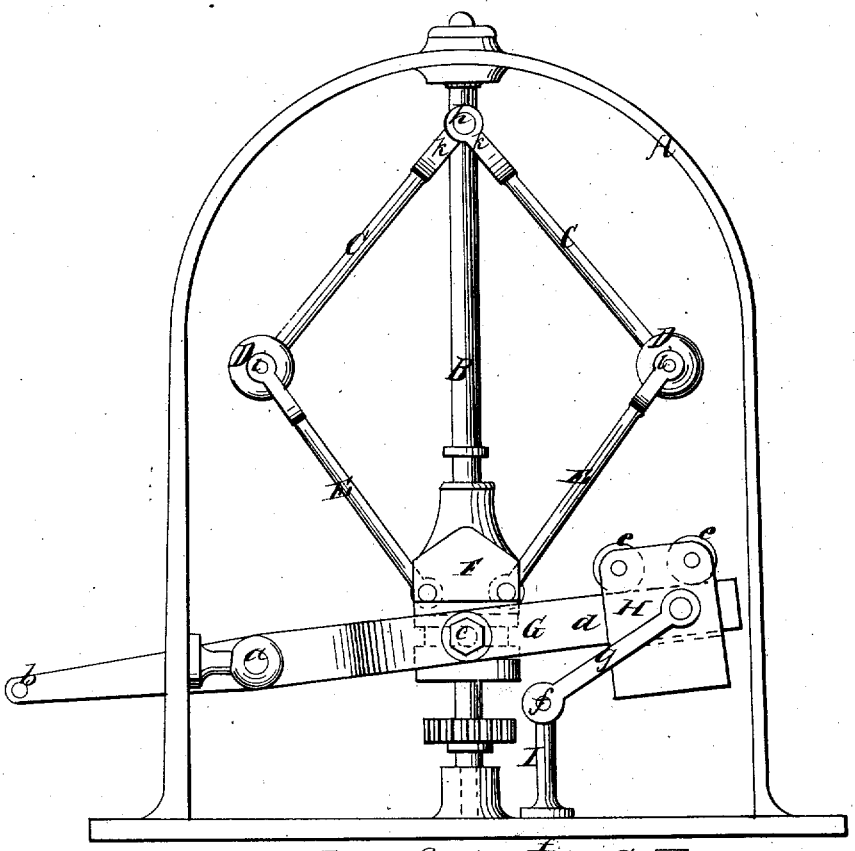
Figure 2:
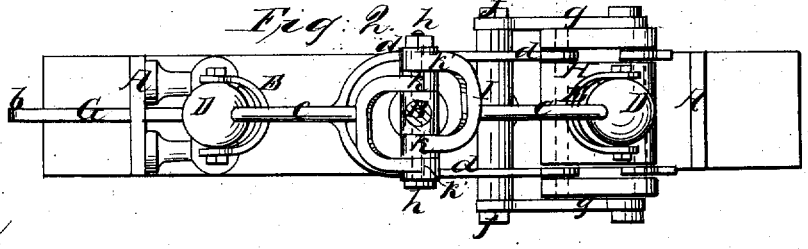

Figure 1 is an elevation of a governor with my improvements. Fig. 2 is a top view of the same, with the upper part of the framing removed to show the joint between the ball-arms and central spindle.

Similar letters of reference indicate corresponding parts in both figures.

The object of my invention is to obtain in a governor of the centrifugal kind the two great requisites for a perfect governor, viz: first, that it shall effect the whole of the movement necessary to enable it to open wide and close the regulating-valve or give the full range of variation the regulator is capable of with but an inappreciable variation in the speed of the engine or motor; and, second, that it shall commence to effect the said movement instantaneously upon the slightest variation of speed in the engine and effect it very rapidly. Neither of these requisites is possessed by the centrifugal governor as ordinarly constructed and applied, owing to its action being so much hindered by the friction of its joints, the constant effect of which is that the balls, which always seek the plane of perfect equilibrium, cannot rise or fall from the plane in which they may be at any time revolving until a force has been in some way developed sufficient to overcome the total amount of such friction. This force is furnished in the preponderance of their centrifugal force when their velocity is increased, and of their gravity when it is diminished, according to the law that the centrifugal force of a body revolving in a given circle varies as the square of its velocity.

In the governor as ordinarily constructed and applied, revolving at about its natural speed, considered as a conical pendulum—that is to say, the speed at which the centrifugal force of the balls sustains them in equilibrium—this preponderance one way or the other develops itself very slowly, especially at first, and a considerable variation of their speed is necessary before it has accumulated to such a degree that the governor will act. What is wanted, then, in this kind of governor to give it a sensitiveness approximating to what it would have if it were possible to construct it to work without friction is some means by which the above-mentioned indispensable force shall be developed rapidly, so that a sufficient amount to overcome the hinderance of friction shall arise from very slight variations in the velocity of revolution. This want has been clearly seen by engineers, and with a view to supply it governors have been constructed with very heavy balls at the ends of long arms; but by this means another difficulty is encountered, which becomes aggravated in proportion as the balls are enlarged and the arms lengthened, for the balls, revolving at a great distance from their common axis and still farther from their points of suspension, require the exertion of a very considerable force to retard or accelerate their velocity, while by the great lateral pressure produced on the joints there arises at the very instant when they ought to act a friction worse than that from all other causes together. Thus between its feebleness and the fact that the only means heretofore known for increasing its power increases in nearly the same ratio the hinderance to its action the performance of the centrifugal governor has been very unsatisfactory.

To effect the necessary increase of power without involving an almost equal loss by friction I make use of very small balls, swinging from a single joint in their common axis of revolution, and drive the governor at a speed several times greater than would be natural to it considered as a conical pendulum, and apply to the slide which connects with the regulating-valve a weight sufficient to act as a counterpoise to the centrifugal force developed by the revolution of the balls.

To enable those skilled in the art to apply my improvement to practice I will proceed to describe its construction and operation.

A is the frame of the governor.

B is the central spindle, arranged vertically, and fitted to suitable bearings in the top and bottom of the frame A.

C C are the upper arms, to which are secured the balls D D, the said arms swinging from the single joint-pin *h*, whose axis intersects the axis of the main spindle B.

E E are the lower arms, connecting the ball-arms C C with the slide F, which is fitted to the main spindle in the usual manner. These arms E E should be connected at the centers of the balls, in order that the gravity and the centrifugal force shall act as nearly as possible at the same point.

G is a lever, connecting the slide F with the throttle or other regulating valve that is employed, said lever working on a fulcrum, *a*, and having its connection with the regulating-valve at *b*.

The weight to act as a counterpoise to the centrifugal force of the balls may be applied to the slide F of the governor in any convenient manner. The simplest mode is to apply it directly to the slide; or, in other words, to make the slide itself of sufficient weight for this purpose; but the drawings represent it (indicated by the letter H) applied upon the lever G, the forked portions *a d* of which, carrying the pins *c c*, which connect it with the slide F, are extended to a considerable length beyond the said pins for the purpose of receiving the said weight, which consists of a solid block of metal having two slots provided in it for the portion *d d* of the lever to pass through. The said slots are represented as being fitted with rollers *e e* to rest upon the said portion *d d* of the lever, to provide for the shifting of the counterpoise upon the lever to vary its effective load on the governor.

Below the part *d d* of the lever G there is represented a small standard, I, which serves as a rest for the said lever G when the governor is not in operation, and also to carry two fixed pins, *f f*, to which the counterpoise is connected by means of two radius-rods, *g g*, which, as the slide F rises and carries the lever G along with it, draw the counterpoise nearer to the fulcrum *a* of the lever, and so diminishes its effective load on the governor. This contrivance for varying the effective load of the counterpoise H was applied with a view to make it always in proportion to the power of the governor to sustain it, but in practice such a contrivance is not necessary, and the counterpoise may be a constant weight.

I have hereinbefore stated as essential to my invention that the balls should be very light, and the velocity of the revolution of the governor several times greater than would be natural to it considered as a conical pendulum. I prefer, generally, that the aggregate weight of the balls shall be five to seven pounds, or thereabout, and that the velocity of revolution shall be about six times the natural velocity, though I by no means intend to limit myself to these or any proportions of weight and velocity. The governor thus constructed with light balls and driven at a high velocity does not differ in the fundamental principle of its action from the centrifugal governor as ordinarily constructed and driven, the balls rising and falling through the same spaces with the same percentage of variation in their velocity—that is, with the same variation in the motion of the engine whether revolving at their natural speed or at any artificial speed sustaining a counterpoise; but it acts very nearly as the ordinary governor would act if no such thing as friction existed, the reasons of which unhindered action I will endeavor to explain as briefly as possible. The first of these reasons is that the centrifugal force of the balls is developed very rapidly, so that a sufficient amount of power to move the slide is furnished by almost imperceptible variations in their velocity. The centrifugal governor has been heretofore constructed with reference to the law that the centrifugal force of the balls varies as their weight. I make application of the other law, that this force varies as the square of their speed. An illustration will show the difference between the two and the advantage of the latter. Balls weighing one pound, making three hundred revolutions per minute, exert the same centrifugal force that is exerted by balls weighing thirty-six pounds making in the same circle fifty revolutions per minute. The balls which I employ exert on any given percentage of change in their velocity a force to move the slide equal to that which would be exerted by balls of from two hundred to two hundred and fifty pounds' weight revolving in the same circle at their natural speed. The second reason is that the changes of velocity in my governor do not occasion a perceptible increase of friction. This is a most important advantage. The great increase of friction at the instant when it should act is the serious fault of the ordinary governor, and if the same obstruction to its action was occasioned in this one by a like percentage of change in its velocity, it is clear that nothing would be gained by this mode of construction beyond the mere convenience of having smaller balls; but such obstruction does not arise in a degree sufficient to be appreciable in practice. The reason of this is threefold. The first and principal reason is found in the different ratios in which momentum and centrifugal force increase. The momentum of the balls determines the power required to drive them and the amount of resistance which they oppose to a force applied to increase or retard their velocity. Momentum is the product of weight multiplied by velocity, and, the weight of the balls being given, their momentum, which causes the friction in question, increases directly as the velocity, while the centrifugal force, which furnishes the power to move the slide, increases as the square of the velocity. For illustration: Balls weighing one pound, making three hundred revolutions per minute, have a momentum, suppose, of three hundred pounds—$300 \times 1 = 300$. Let their speed be increased one per cent., or to three hundred and three revolutions per minute, they will then have a momentum of three hundred and three pounds—$303 \times 1 = 303$. But balls weighing thirty-six pounds, making in the same circle fifty revolutions per minute, will have a momentum of eighteen hundred—$36 \times 50 = 1{,}800$. Let their speed be increased one per cent., or to 50.5 revolutions per minute, they will then have a momentum of eighteen hundred and eighteen pounds—$36 \times 50.5 = 1{,}818$. The momentum of the balls and also the increase of their momentum on any given percentage of increase in their velocity is thus seen to be six times as much in the latter case as in the former; but we have already seen that the centrifugal force of the balls in each of these cases is the same. By this arrangement, then, the weight and velocity being employed in the proportions here supposed, equal centrifugal force is obtained with only one-sixth as much momentum and one-sixth of the friction arising on any given change in the velocity of the engine so far as the balls are concerned.

Second. To this must be added the resistance which the counterpoise opposes to changes of its velocity. This, however, is in effect but very trifling, owing to the fact that it is exerted within a very small circle about the axis of revolution, while, on the other hand, the counterpoise, moving through nearly twice the vertical distance which the balls do, exerts the same power to overcome friction in the joints of the governor that it would exert if it were applied to the ends of the upper arms produced to nearly twice their length and was revolving in a circle nearly twice as large as that described by the balls.

Third. In order to obviate as much as possible the friction which would still be produced between the faces in the upper joint of the governor I construct the said joint in the manner shown in Fig. 2, making each arm, C, with a similar wide fork, *k k'*, which is so formed relatively to its respective arm, as shown in the above-mentioned figure, that when the arms and spindle are put together each arm may form the outer portion of the joint on one side thereof and yet that the centers of the balls may oscillate in a plane passing through the axis of the central spindle, B. By this construction each arm is made to thrust against the single joint *h* at a right angle thereto and close to one end thereof, and both arms are caused to have a precisely similar action, and by making the joint of a considerable length the faces of the joints may be almost entirely relieved of pressure, while the pressure against the joint-pin is at a considerable distance from the axis of revolution.

Having thus described my invention, I will proceed to state what I claim as my invention and desire to secure by Letters Patent—

1. In combination with arms and very small balls or their equivalents, revolving at a velocity several times greater than would be due or natural to them considered as a conical pendulum, the employment of a counterpoise, applied substantially as described, and so proportioned in weight as to balance, or nearly so, the centrifugal force developed by the revolution of the said arms and balls or their equivalents.

2. The employment, at the connection between the arms and the central spindle of the governor, of a joint constructed substantially as described, and illustrated in Fig. 2, whereby each arm is brought to the outside of the joint on one side and made to thrust against the joint-pin close to one end thereof at a right angle and at a distance from the axis of revolution, as herein described.

CHAS. T. PORTER.

Witnesses:

HENRY T. BROWN,

M. M. LIVINGSTON.